US011386171B1

(12) United States Patent
Young et al.

(10) Patent No.: US 11,386,171 B1
(45) Date of Patent: Jul. 12, 2022

(54) DATA COLLECTION AND FILTERING FOR VIRTUAL ASSISTANTS

(71) Applicant: Wells Fargo Bank, N.A., San Francisco, CA (US)

(72) Inventors: Michelle M. Young, Houston, TX (US); Paul Vittimberga, Oakland, CA (US); Wayne Barakat, Novato, CA (US); David Newman, Walnut Creek, CA (US); Vincent Le Chevalier, San Jose, CA (US); Brian P. McMahon, Berkeley, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 268 days.

(21) Appl. No.: 15/797,896

(22) Filed: Oct. 30, 2017

(51) Int. Cl.
| | |
|---|---|
| *G06F 16/9535* | (2019.01) |
| *G06F 16/9038* | (2019.01) |
| *H04L 67/53* | (2022.01) |
| *H04L 9/40* | (2022.01) |
| *H04W 76/10* | (2018.01) |
| *H04W 4/80* | (2018.01) |

(52) U.S. Cl.
CPC ...... *G06F 16/9535* (2019.01); *G06F 16/9038* (2019.01); *H04L 63/14* (2013.01); *H04L 67/20* (2013.01); *H04W 4/80* (2018.02); *H04W 76/10* (2018.02)

(58) Field of Classification Search
CPC . G07F 19/2055; H04L 63/1466; H04L 63/14; H04L 67/20; G06F 21/6263; G06F 16/9535; G06F 16/9038
See application file for complete search history.

(56) References Cited

U.S. PATENT DOCUMENTS

| | | | |
|---|---|---|---|
| 7,459,898 B1* | 12/2008 | Woodings | G01R 23/16 324/76.19 |
| 8,327,450 B2 | 12/2012 | Clement et al. | |
| 8,893,297 B2 | 11/2014 | Eversoll et al. | |
| 9,092,796 B2 | 7/2015 | Eversoll et al. | |
| 9,165,161 B2 | 10/2015 | Abdo et al. | |
| 9,548,050 B2 | 1/2017 | Gruber et al. | |
| 2003/0097451 A1 | 5/2003 | Bjorksten et al. | |
| 2006/0046744 A1* | 3/2006 | Dublish | H04L 63/0442 455/456.3 |

(Continued)

FOREIGN PATENT DOCUMENTS

WO WO-2016063092 A1 4/2016

OTHER PUBLICATIONS

"Customer Intelligence Management (CIM)", [Online] https://www.informatica.com/products/master-data-managemerrt/customer-360-insights.html#fbid=mNjRlxfDkuR, (Accessed on May 11, 2019), 7 pgs.

(Continued)

*Primary Examiner* — Apu M Mofiz
*Assistant Examiner* — Farhad Agharahimi
(74) *Attorney, Agent, or Firm* — Schwegman Lundberg & Woessner, P.A.

(57) ABSTRACT

Among other things, embodiments of the present disclosure can help improve the functionality of virtual assistant (VA) systems by determining filtering criteria that applies to inputs received by the system, and storing information associated with the inputs (and controlling access to such information by different users of the VA system) in accordance with the filtering criteria.

21 Claims, 4 Drawing Sheets

(56) References Cited

U.S. PATENT DOCUMENTS

| | | | |
|---|---|---|---|
| 2006/0056626 A1* | 3/2006 | Keohane | G06F 3/04895 |
| | | | 380/206 |
| 2007/0118876 A1* | 5/2007 | Singh | H04L 63/107 |
| | | | 726/2 |
| 2008/0134282 A1* | 6/2008 | Fridman | G06Q 10/10 |
| | | | 726/1 |
| 2011/0276513 A1 | 11/2011 | Erhart et al. | |
| 2013/0139229 A1 | 5/2013 | Fried et al. | |
| 2014/0143666 A1 | 5/2014 | Kennedy et al. | |
| 2015/0113666 A1* | 4/2015 | Buck | G06F 21/554 |
| | | | 726/28 |
| 2015/0193638 A1 | 7/2015 | Cook | |
| 2016/0065740 A1 | 3/2016 | Ristock et al. | |
| 2016/0140525 A1* | 5/2016 | Ferreira da Silva | |
| | | | G06Q 20/102 |
| | | | 705/43 |
| 2016/0350553 A1* | 12/2016 | Alameh | G06F 21/6245 |
| 2017/0230342 A1* | 8/2017 | Iyer | H04L 63/0428 |
| 2017/0346853 A1* | 11/2017 | Wyatt | H04L 9/3265 |
| 2018/0090137 A1* | 3/2018 | Horling | G06F 16/9535 |
| 2018/0261051 A1* | 9/2018 | Ooi | G07F 19/2055 |
| 2018/0343561 A1* | 11/2018 | Patterson | H04W 12/082 |

OTHER PUBLICATIONS

Botelho, Bridget, "What is virtual assistant (AI assistant)?—Definition from WhatIs.com", Tech Target, [Online]. Retrieved from the Internet: <URL: https://searchcustomerexperience.techtarget.com/definition/virtual-assistant-AI-assistant>, (Accessed Aug. 4, 2021), 5 pgs.

* cited by examiner

DATA COLLECTION AND FILTERING FOR VIRTUAL ASSISTANTS

BACKGROUND

The popularity of virtual assistants (VAs) continues to grow. Virtual assistants are software-implemented systems that interact with users (often via voice recognition) to answer questions and perform tasks and services for users. Conventional VAs, however, may not be able to appropriately determine which data should be collected or stored, or identify the data that different users with access to a VA should have access to. Embodiments of the present disclosure address these and other issues.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not of limitation, in the figures of the accompanying drawings, in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure can help improve the functionality of virtual assistant (VA) systems by determining filtering criteria that applies to inputs received by the system, and storing information associated with the inputs (and controlling access to such information by different users of the VA system) in accordance with the filtering criteria.

Figure 1A:
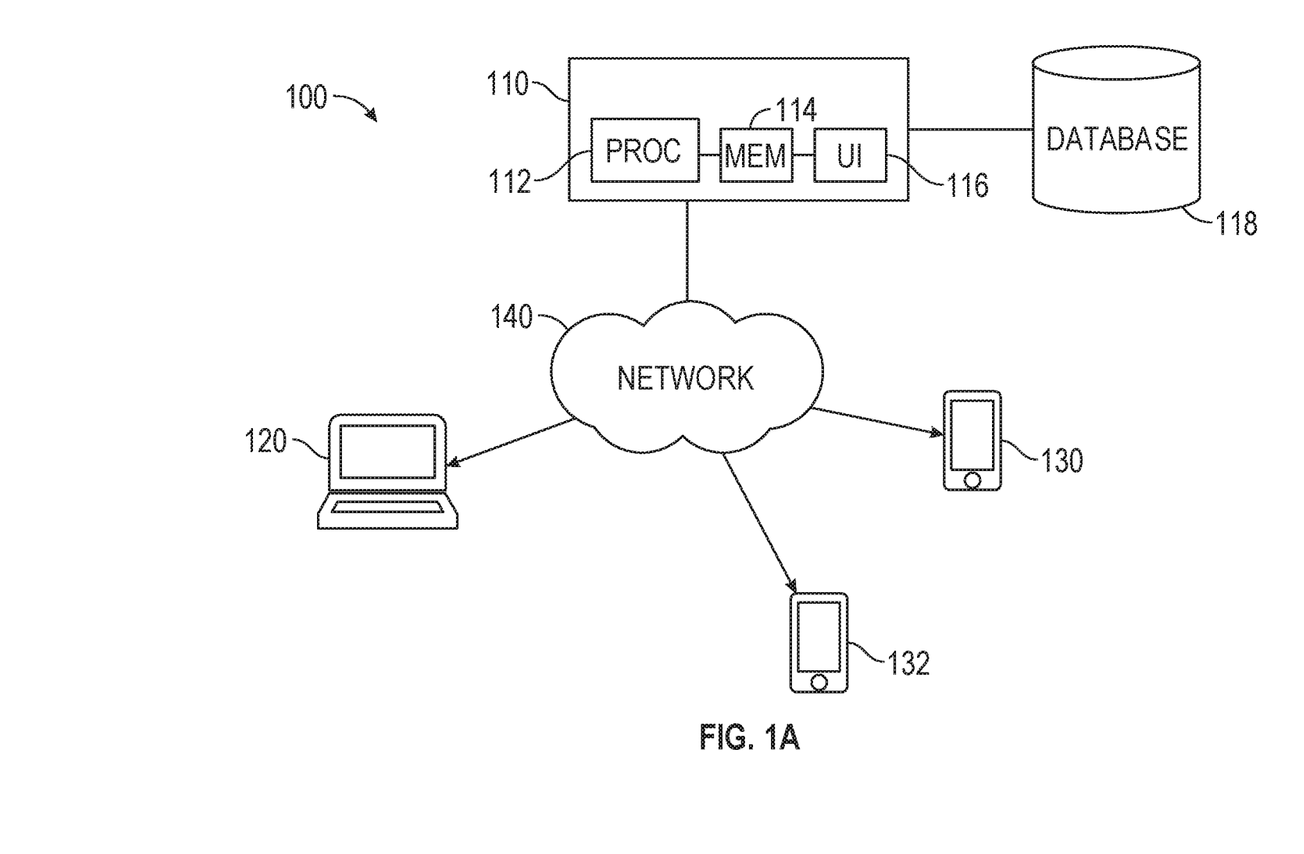
FIG. 1A illustrates a block diagram of an exemplary system according to various aspects of the disclosure.

FIG. 1A is a block diagram of system which may be used in conjunction with various embodiments. While FIG. 1A illustrates various components of a computer system, it is not intended to represent any particular architecture or manner of interconnecting the components. Other systems that have fewer or more components may also be used.

In FIG. 1A, the system 100 includes a server computer system 110 comprising a processor 112, memory 114, and user interface 116. Computer system 110 may include any number of different processors, memory components, and user interface components, and may interact with any other desired systems and devices in conjunction with embodiments of the present disclosure.

The functionality of the computer system 110, including the steps of the methods described below (in whole or in part), may be implemented through the processor 112 executing computer-readable instructions stored in the memory 114 of the system 110. The memory 114 may store any computer-readable instructions and data, including software applications, applets, and embedded operating code. Portions of the functionality of the methods described herein may also be performed via software operating on one or more of the client computing devices 120, 130, 132.

The functionality of the system 110 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 112 retrieves and executes instructions stored in the memory 114 to control the operation of the system 110. Any type of processor, such as an integrated circuit microprocessor, microcontroller, and/or digital signal processor (DSP), can be used in conjunction with embodiments of the present disclosure. A memory 114 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 114 in any desired manner, such as in a relational database.

The system 110 includes a user interface 116 that may include any number of input devices (not shown) to receive commands, data, and other suitable input. The user interface 116 may also include any number of output devices (not shown) to provide the user with data, notifications, and other information. Typical I/O devices may include touch screen displays, display screens, mice, keyboards, modems, network interfaces, printers, scanners, video cameras and other devices.

The system 110 may communicate with one or more client computing devices 120, 130, 132 as well as other systems and devices in any desired manner, including via network 140. The system 110 and/or computing devices 120, 130, 132 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 140 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

The system 110 may include (e.g., in the memory 114) a database, and may communicate with any number of other databases, such as database 118. Any such databases may include a relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Figure 2:
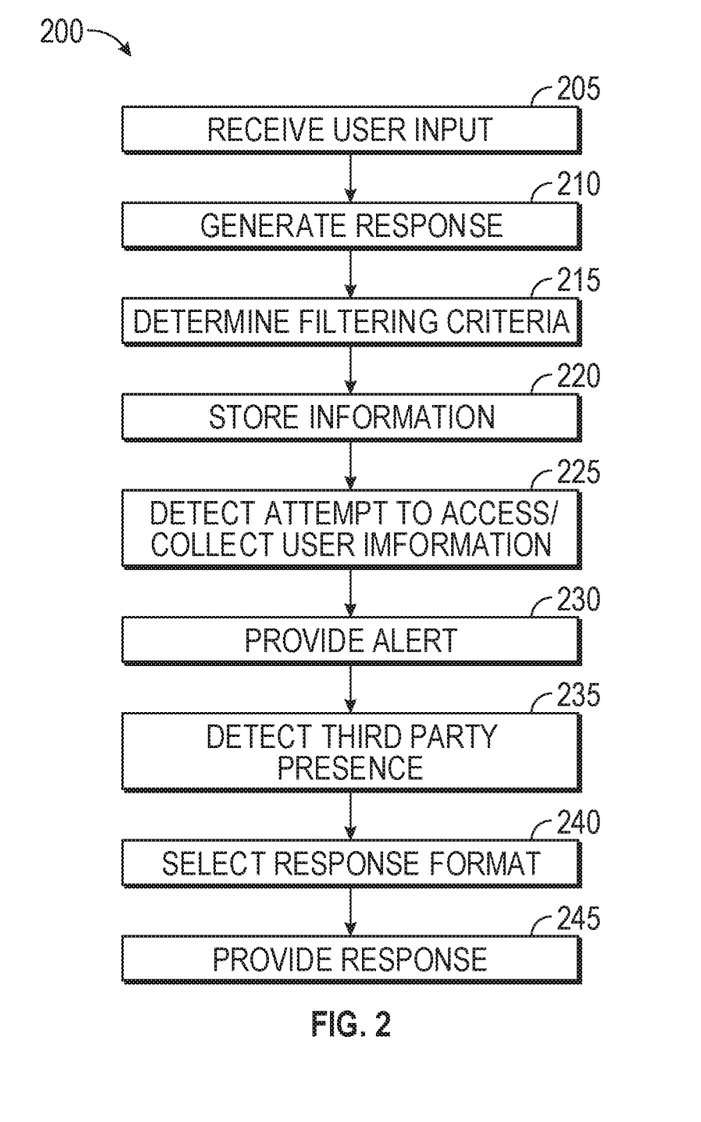
FIG. 2 is a flow diagram of an exemplary process according to various aspects of the disclosure.
Figure 3:
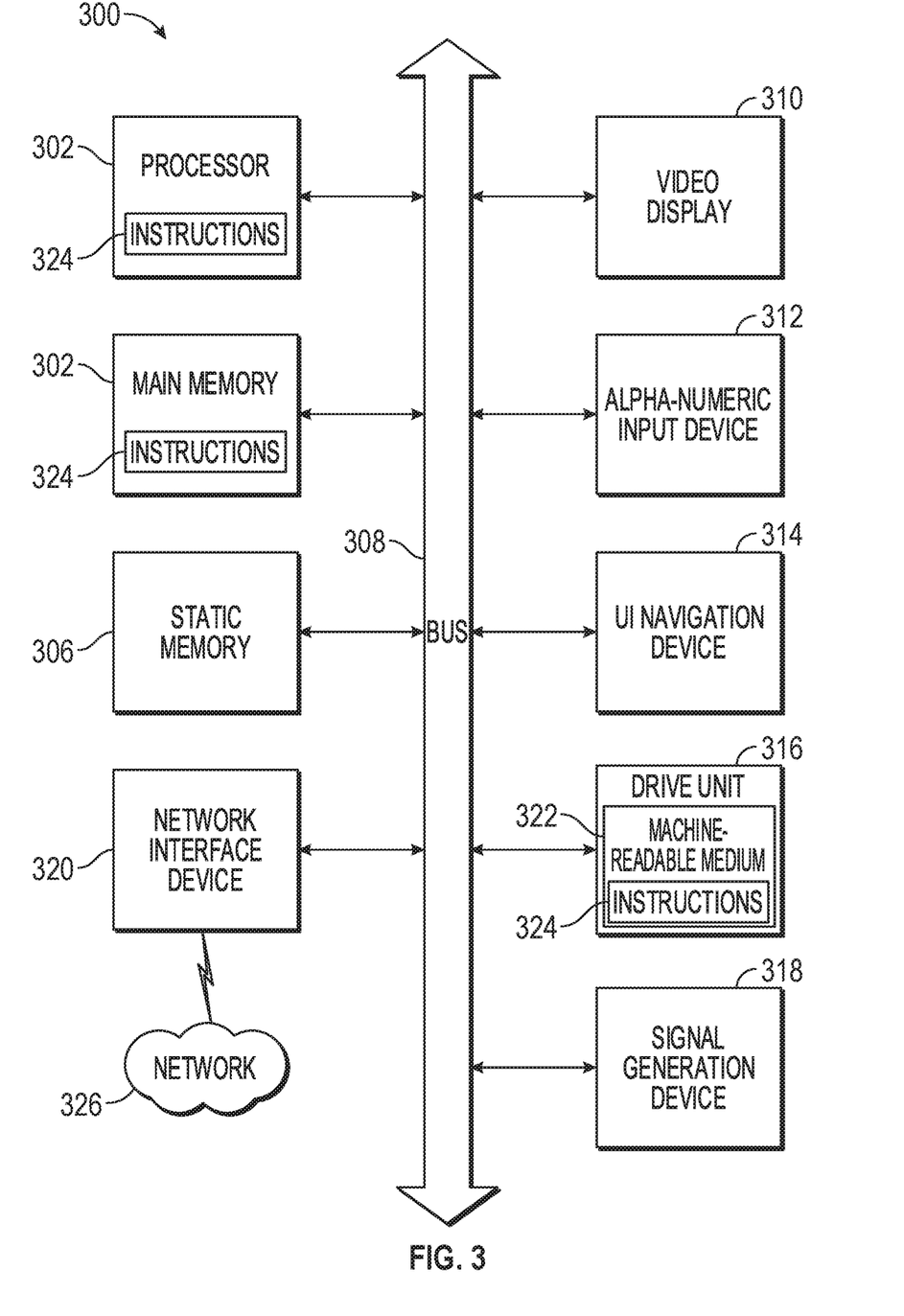
FIG. 3 is a block diagram of an exemplary machine according to various aspects of the disclosure.

FIG. 2 depicts an exemplary process according to various aspects of the present disclosure. In this example, method 200 includes receiving user input (205), generating a response to the input (210), determining filtering criteria for the input and/or response (215), and storing information associated with the input and/or response (220). Method 200 further includes detecting an attempt to access and/or collect information associated with a user (225), providing an alert regarding the attempt (230), determining the presence of a third party proximate a user (235), selecting a format for the response to the user's input based on the presence of the third party (240), and providing the response to the user (245). The steps of method 200 may be performed in whole or in part, may be performed in conjunction with some or all of the steps in other methods, and may be performed by any number of different systems, such as the systems described in FIGS. 1A and/or 3.

In the example shown in FIG. 1A for instance, a virtual assistant may be implemented entirely via software operating on a user's computing device 120, 130, or 132 or via a combination of software on a user's computing device in conjunction with software operating on the server computing system 110. In some embodiments, a virtual assistant operates on the server computer system 110 and is accessed via a web-based interface on the user's client computing device 120, 130, 132.

Figure 1B:
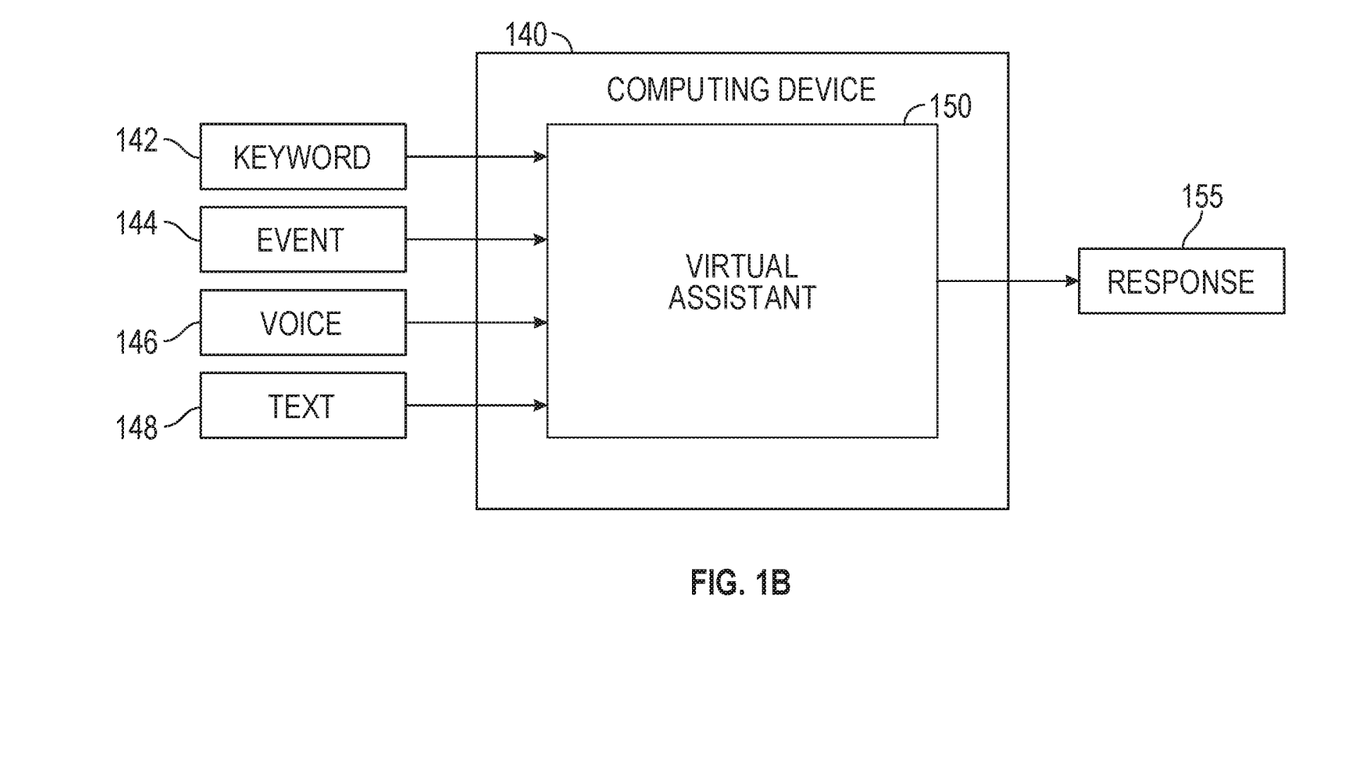
FIG. 1B illustrates a block diagram of a virtual assistant operating on a computing device according to various aspects of the disclosure.

FIG. 1B illustrates one example of a virtual assistant operating on a computing device 140. The computing device 140 may include one or more systems, such as user's computing device 120, 130, 132, and/or server computing system 110. In this example, the virtual assistant 150 is implemented via software operating on the computing device 140. In other embodiments, the virtual assistant may be implemented via hardware, software, or a combination of the two. The virtual assistant 150 receives inputs from a user, namely keyword inputs 142, event inputs 144, voice inputs 146, and/or text inputs 148. The virtual assistant 150 analyzes the inputs and provides a response 155 to the user.

In the method 200 shown in FIG. 2, the system (e.g., server computer system 110 in FIG. 1A) receives an input from a user directed to a virtual assistant operating on the system (205). A variety of inputs from the user may be received, such as a request for information from the virtual assistant (e.g., "where is the closest restaurant?", "what is the balance of my checking account?", etc.), and/or a request for the virtual assistant to perform a task ("reserve a table for me at the restaurant you just identified," "move $100 from savings to checking," etc.). Inputs from a user may be received in a variety of different formats, such as text and audio.

The system analyzes the user's input and generates (210) a response. The system may generate (210) a variety of different types of responses, different formats of responses, and different content within the responses. For example, if the user requests information from the VA, the VA system may gather the information and provide a response (245) that contains the information back to the user. In another example, if the user requests the VA perform a task, the VA system may perform the task and provide a response confirming the task was completed.

The system may provide (245) a response to the user in a variety of different ways. In some embodiments, the system provides a response to a user's input in the same format (e.g., audio, text, etc.) as the input. In this context, a "response" generally refers to any output provided by the system to the user. Accordingly, the virtual assistant system may provide a user information, perform a task, or take other action without a user necessarily providing any input. In another example, demographic information (such as the user's age, employment status, etc.) may be used in generating (210) the response to identify a predetermined time to provide the response to the user when the user is likely to be available and receptive to the response.

The VA system may receive (205) data of a variety of different types and sources. For example, the VA system may receive user location data (e.g., from a mobile computing device of the user), data describing the user's interactions on social media, data describing the user's financial transaction history, and data from inputs from the user to the VA system.

The system determines a filtering criteria (215) for information associated with inputs from the user and/or responses from the VA system. The VA system may determine and utilize filtering criteria based on different storage and/or reporting standards for different data and/or different users. For example, a first user may have a first set of storage standards for determining the manner in which data associated with the first user is stored and a first set of reporting standards for determining the manner in which data associated with the first user is reported to the first user and others. By contrast, a second user may have a second set of storage and reporting standards, different from the first set of standards for the first user. In such cases, the system may determine filtering criteria from the different standards such that the first user might be able to retrieve all of his or her own data, but others may have restrictions on what portion of the first user's data that they can see. In this manner, different users of the same VA system can have information stored and provided according to different filtering standards.

Information associated with input from users of a VA system and output (e.g., responses) from the VA system may be stored (220) in a database by the VA system, such as a database stored in the memory 114 of server computer system 110 in FIG. 1A. Storage and/or reporting standards may be set automatically or may be received from a user. For example, the user may provide an input to the VA system that includes a voice command indicating that data captured is to be private ("VA, I need privacy") or provide UI with detailed list of data to include or exclude in data that is stored or reported.

In some cases, storage and/or reporting standards may be subject to default or unchangeable settings, for example, driven by legal requirements or financial institution policy (e.g., data that memorializes instructions from user). In some examples, the information that is stored or reported by the VA system can be filtered to exclude extraneous content, such as obscenities, background noise, and/or content that is irrelevant to the user's input or the response from the VA, such as small talk, voice input from individuals who are not users of the VA system, etc.

In some embodiments, the system automatically deletes at least a portion of the information associated with the input and/or responses prior to, or subsequent to, the information being stored. For example, data received by the VA system may be tagged at collection as deletable or non-deletable. Deletable data may be deleted, for example, at a predetermined interval, after the data is held for a predetermined time, and/or upon a command from the user.

In some embodiments, the VA system may be adapted to detect a third-party system attempting to collect information regarding the user and provide an alert to the user using the VA (or take other action) in response to detecting the attempt. In addition to alerting the user, the system may disable a feature of the user's computing device to help protect the user. For example, the system may identify third-party systems or devices attempting to track a user's location via the user's mobile device by establishing communications with the user's mobile device. In such cases, the VA system may provide an alert to the user via the virtual assistant that identifies the third party systems while automatically turning off the location function of a mobile device. The system may also turn off features of a user's computing device (or the device entirely) until the system determines the user is no longer in danger of being surveilled.

Detecting an attempt to collect information by the VA system may include detecting Bluetooth or other near-field communication handshaking or other attempts at electronic communication with, or tracking of, a user's computing device. In another example, the VA system may detect a surveillance system (e.g., microphones, cameras, etc.) at a common location with the user's computing device. In one such example, the user may be carrying a mobile computing device and walk into an area known to have surveillance systems active, such as a store known to operate a camera surveillance system. In another example, the system may detect electronic communications (e.g., on a wireless band) indicative of an audio or video monitoring system in proximity to the user. In such cases, the system can alert the user to the presence of such surveillance systems to help the user avoid divulging personal information, such as uttering his or her financial account information or passwords near a monitoring device.

The system may detect an attempt to access information associated with the user, as well as inputs from, and responses to, the user from the VA system. For example, if another user attempts to access a stored audio recording containing the user's instructions to the VA system (e.g., by accessing the database where the recording is stored via a web-based interface) the system may immediately alert the user to the attempt via the virtual assistant, giving the user the option to allow or deny the access.

The system may provide responses and other content to users using the virtual assistant based on the user's environment. For example, the system may detect (e.g., using the camera, microphone, communication modules, and/or other sensors or components of the user's computing device) the presence of a third party proximate to the computing device of the user where the content from the VA is to be delivered. In specific examples, the VA system may determine the user is in a business meeting with colleagues, at a crowded bar, or in another environment where individuals nearby could potentially eavesdrop or view content delivered to the user by the VA system. In such cases, the system may select a format for providing a response or other content to the user based on the presence of such third parties.

In one example, a user may request his or her bank account balance from the virtual assistant. Though the request may be provided audibly, the system may determine the user's computing device is close enough to other people that providing the response audibly is likely to be overheard. In this example, the system may still provide an audio response, but do so at a diminished volume such that only the user can hear the response. Additionally or alternatively, the system may provide the response on the display screen of the user's device instead of in audio format. Furthermore, the system may reduce the brightness level of the display of the user's computing device during presentation of the response to further help avoid disclosing information to nearby third parties.

In some embodiments, the VA system filters and regulates social media posts (e.g., related to the location of the user or a group of users—such as a family) and holds social media posts until reviewed/approved by the user. For example, if a user's child attempts to post a picture to a social media website, the VA system may intercept the post, alert the parents of the child, and only complete the post in response to authorization by the parents. In another example, the VA system may intercept an attempt by an employee of a company to post an article regarding a product made by the company to a social media site or other website. The system may alert the company's legal department or other authority within the company to the attempted post and only complete the posting after authorization is provided.

FIG. 3 is a block diagram illustrating exemplary components of a computing system 300 that may operate in conjunction with embodiments of the present disclosure. System 300 (in whole or in part) may be (or include) any of the computing devices 110, 120, 130, 132 shown in FIG. 1A. In this example, system 300 reads instructions 324 from a machine-readable medium (e.g., a tangible, non-transitory, machine-readable storage medium) 322 to perform a variety of functions, including any of the processes (in whole or in part) described herein.

System 300 can be connected (e.g., networked) to other machines. In a networked deployment, the system 300 can operate in the capacity of a server machine or a client machine in a server-client network environment, as well as a peer machine in a peer-to-peer (or distributed) network environment. System 300 may be (or include) a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 324, sequentially or otherwise, that specify actions to be taken by that machine. While only a single machine is illustrated in FIG. 3, the term "machine" or "system" as used herein may also include any number of different devices, systems, and/or machines that individually or jointly execute the instructions 324 to perform any one or more of the methodologies discussed herein. Additionally, alternate systems operating in conjunction with the embodiments of the present disclosure may have some, all, or multiples of the components depicted in FIG. 3.

In the example shown in FIG. 3, system 300 includes processor 302. Any processor may be used in conjunction with the embodiments of the present disclosure, such as a central processing unit (CPU), a graphics processing unit (GPU), a digital signal processor (DSP), an application specific integrated circuit (ASIC), a radio-frequency integrated circuit (WIC), or any suitable combination thereof. System 300 further includes a main memory 304 and a static memory 306, which are configured to communicate with each other via a bus 308.

The system 300 further includes a user interface that may include a variety of components, including one or more output devices such as a graphics display 310 (e.g., a plasma display panel (PDP), a light emitting diode (LED) display, a liquid crystal display (LCD), a projector, or a cathode ray tube (CRT)). The user interface of the system 300 may also include any number of input devices and other components, including an alphanumeric input device 312 (e.g., a keyboard), a cursor control device 314 (e.g., a mouse, a touchpad, a trackball, a joystick, a motion sensor, or other pointing instrument), a storage unit 316, a signal generation device 318 (e.g., a speaker), and a network interface device 320.

The storage unit 316 includes a machine-readable medium 322 on which is stored the instructions 324 (e.g., software) embodying any one or more of the methodologies or functions described herein. The instructions 324 can also reside, completely or at least partially, within the main memory 304, within the processor 302 (e.g., within the processor's cache memory), or both, during execution thereof by the system 300. Accordingly, the main memory 304 and the processor 302 can be considered as machine-readable media. The instructions 324 can be transmitted or received over a network 326 via the network interface device 320.

As used herein, the term "memory" may refer to any machine-readable medium able to store data temporarily or permanently, including random-access memory (RAM), read-only memory (ROM), buffer memory, flash memory, and/or cache memory. While the machine-readable medium 322 is shown in this example as a single medium, the term "machine-readable medium" may include a single medium or multiple media (e.g., a centralized or distributed database, or associated caches and servers) able to store instructions 324. The term "machine-readable medium" may also include any medium, or combination of multiple media, that is capable of storing instructions (e.g., software) 324 for execution by a machine. Accordingly, a "machine-readable medium" refers to a single storage apparatus or device, as well as "cloud-based" storage systems or storage networks that include multiple storage apparatus or devices. The term "machine-readable medium" may also include one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific exemplary embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A mobile device of a user, the mobile device comprising:
    a software-implemented virtual assistant operating on the mobile device;
    a processor; and
    memory coupled to the processor and storing instructions that, when executed by the processor, cause the mobile device to perform operations comprising:
        receiving, from the user, an input directed to the virtual assistant;
        generating a response to the received input;
        determining a filtering criteria for the received input;
        storing information according to the filtering criteria, the stored information being associated with one or more of the received input and the generated response;
        providing the generated response to the user via the virtual assistant according to the filtering criteria;
        detecting a third-party system attempting to collect information regarding the user, the detecting of the third-party system attempting to collect information regarding the user including detecting the third-party system attempting to track a location of the user by attempting to connect with the mobile device; and
        providing an alert to the user, via the virtual assistant, the alert relating to the third-party system attempting to collect information regarding the user.

2. The mobile device of claim 1, wherein the received input includes one or more of a request for information from the virtual assistant and a request for the virtual assistant to perform a task.

3. The mobile device of claim 1, wherein the received input includes one or more of audio input and text input.

4. The mobile device of claim 1, wherein determining the filtering criteria is based on a first set of storage standards for the user, the first set of storage standards being different than a second set of storage standards for a second user of the virtual assistant.

5. The mobile device of claim 1, wherein determining the filtering criteria is based on a first set of reporting standards for the user, the first set of reporting standards being different than a second set of reporting standards for a second user of the virtual assistant.

6. The mobile device of claim 1, wherein determining the filtering criteria includes receiving, from the user via the virtual assistant, one or more of a storage standard and a reporting standard.

7. The mobile device of claim 1, wherein storing the information associated with one or more of the received input and the generated response includes filtering out extraneous content from the stored information based on the filtering criteria.

8. The mobile device of claim 7, wherein the extraneous content includes one or more of an obscenity, background noise, and content that is irrelevant to one or more of the received input and the generated response.

9. The mobile device of claim 1, wherein storing the information includes automatically deleting at least a portion of the information subsequent to storing the information in response to one or more of expiration of predetermined time period and a command being received from the user.

10. The mobile device of claim 1, wherein detecting the third-party system attempting to track a location of a user by attempting to connect with the mobile device includes detecting the third-party system attempting to establish near-field communications with the mobile device.

11. The mobile device of claim 1, wherein detecting the third-party system attempting to collect information regarding the user further includes detecting a third-party surveillance system at a common location with the mobile device.

12. The mobile device of claim 1, the operations further comprising disabling a feature of the mobile device in response to detecting the third-party system attempting to collect information regarding the user.

13. The mobile device of claim 1, the operations further comprising:
detecting an attempt to access the stored information; and
providing an alert to the user, via the virtual assistant, the alert identifying the attempt to access the stored information.

14. The mobile device of claim 1, wherein providing the generated response to the user includes:
determining a presence of a third party proximate to the mobile device; and
selecting a format for providing the generated response based on the presence of the third party.

15. The mobile device of claim 14, wherein selecting the format for providing the generated response includes diminishing a volume of an audio response.

16. The mobile device of claim 14, wherein selecting the format for providing the generated response includes reducing a brightness level on a display of the mobile device during presentation of the response to the user.

17. The mobile device of claim 1, wherein the operating of the virtual assistant on the mobile device comprises the virtual assistant interacting with the user to perform functions comprising answering questions for the user, performing tasks for the user, and performing services for the user.

18. A method comprising:
receiving, by a mobile device of a user, an input from the user, the received input being directed to a software-implemented virtual assistant operating on the mobile device;
generating, by the mobile device, a response to the received input;
determining, by the mobile device, a filtering criteria for the received input;
storing, by the mobile device, information according to the filtering criteria, the stored information being associated with one or more of the received input and the generated response;
providing, by the mobile device, the generated response to the user via the virtual assistant according to the filtering criteria;
detecting, by the mobile device, a third-party system attempting to collect information regarding the user; the detecting of the third-party system attempting to collect information regarding the user including detecting the third-party system attempting to track a location of the user by attempting to connect with the mobile device; and
providing, by the mobile device, an alert to the user, via the virtual assistant, the alert relating to the third-party system attempting to collect information regarding the user.

19. A non-transitory computer-readable medium storing instructions that, when executed by a mobile device of a user, cause the mobile device to perform operations comprising:
receiving an input from the user, the received input being directed to a software-implemented virtual assistant operating on the mobile device;
generating a response to the received input;
determining a filtering criteria for the received input;
storing information according to the filtering criteria, the stored information being associated with one or more of the received input and the generated response;
providing the generated response to the user via the virtual assistant according to the filtering criteria;
detecting a third-party system attempting to collect information regarding the user, the detecting of the third-party system attempting to collect information regarding the user including detecting the third-party system attempting to track a location of the user by attempting to connect with the mobile device; and
providing an alert to the user, via the virtual assistant, the alert relating to the third-party system attempting to collect information regarding the user.

20. The method of claim 18, wherein the operating of the virtual assistant on the mobile device comprises the virtual assistant interacting with the user to perform functions comprising answering questions for the user, performing tasks for the user, and performing services for the user.

21. The non-transitory computer-readable medium of claim 19, wherein the operating of the virtual assistant on the mobile device comprises the virtual assistant interacting with the user to perform functions comprising answering questions for the user, performing tasks for the user, and performing services for the user.

* * * * *

UNITED STATES PATENT AND TRADEMARK OFFICE
CERTIFICATE OF CORRECTION

| | | |
|---|---|---|
| PATENT NO. | : 11,386,171 B1 | Page 1 of 1 |
| APPLICATION NO. | : 15/797896 | |
| DATED | : July 12, 2022 | |
| INVENTOR(S) | : Young et al. | |

It is certified that error appears in the above-identified patent and that said Letters Patent is hereby corrected as shown below:

In the Claims

In Column 10, Line 21, in Claim 18, delete "user;" and insert --user,-- therefor Signed and Sealed this
Thirtieth Day of August, 2022

Katherine Kelly Vidal
*Director of the United States Patent and Trademark Office*